United States Patent [19]

Datta et al.

[11] Patent Number: 5,630,147
[45] Date of Patent: May 13, 1997

[54] SYSTEM MANAGEMENT SHADOW PORT

[75] Inventors: Sham Datta; Jayesh Joshi, both of Santa Clara; James P. Kardach, San Jose, all of Calif.

[73] Assignee: Intel Corporation, Santa Clara, Calif.

[21] Appl. No.: 601,697

[22] Filed: Feb. 15, 1996

Related U.S. Application Data

[63] Continuation of Ser. No. 168,953, Dec. 17, 1993, abandoned.

[51] Int. Cl.$^6$ .................................................. G06F 11/00
[52] U.S. Cl. .................................. 395/750; 364/707
[58] Field of Search ........................... 395/750, 739–742, 395/800, 300; 364/707

[56] References Cited

U.S. PATENT DOCUMENTS

| | | | |
|---|---|---|---|
| 4,935,929 | 6/1990 | Sidman et al. | 371/22.3 |
| 5,131,082 | 7/1992 | Bonevento et al. | 395/275 |
| 5,150,467 | 9/1992 | Hayes et al. | 395/325 |
| 5,237,692 | 8/1993 | Raasch et al. | 395/725 |
| 5,261,057 | 11/1993 | Coyle et al. | 395/275 |
| 5,283,792 | 2/1994 | Davies, Jr. et al. | 371/66 |
| 5,313,642 | 5/1994 | Seigel | 395/750 |
| 5,353,414 | 10/1994 | Iida et al. | 395/325 |
| 5,359,569 | 10/1994 | Fujita et al. | 365/229 |
| 5,379,434 | 1/1995 | DiBrino | 395/737 |
| 5,388,265 | 2/1995 | Volk | 395/750 |
| 5,390,350 | 2/1995 | Chung et al. | 395/150 |
| 5,396,635 | 3/1995 | Fung | 395/800 |
| 5,398,244 | 3/1995 | Mathews et al. | 370/85.6 |
| 5,404,546 | 4/1995 | Stewart | 395/750 |
| 5,408,668 | 4/1995 | Tomai | 395/750 |
| 5,426,741 | 6/1995 | Butts, Jr. et al. | 395/309 |
| 5,440,722 | 8/1995 | VanderSpek et al. | 395/183.19 |

*Primary Examiner*—Jack B. Harvey
*Assistant Examiner*—Paul R. Myers
*Attorney, Agent, or Firm*—Blakely, Sokoloff, Taylor & Zafman

[57] ABSTRACT

A device and method for transferring data, address and status information concerning a former I/O bus cycle before a system management interrupt is initiated. A plurality of system management shadow registers samples information from a system bus. Such information is obtained by a register accessing the plurality of system management shadow registers through a common shadow port.

18 Claims, 4 Drawing Sheets

SYSTEM MANAGEMENT SHADOW PORT

This is a Continuation application of application Ser. No. 08/168,953, filed Dec. 17, 1993, now abandoned.

BACKGROUND OF THE INVENTION

1. Field of the Invention

The present invention relates to a power management architecture scheme in a computer system having a plurality of bus masters and at lease one bus slave both being coupled to a system bus. More specifically, the present invention relates to a shadow port and corresponding register used for accessing data, address and status information stored in a plurality of shadow registers pertaining to a most recent input/output ("I/O") bus cycle in order to enable a system management software application to perform its intended purpose.

2. Background of the Field

It is becoming a necessity for many companies to use portable and laptop computers in their daily business activities. As a result, the portable and laptop computer markets are becoming quite profitable and highly competitive within the computer industry. Since portable and laptop computers are becoming more prevalent in the marketplace, there exists a crucial need for efficient power management architecture schemes. This is due to the fact that portable and laptop computers are commonly powered by limited power sources (such as batteries) and thus, power should be conserved wherever possible for reliability and economic reasons.

Conventional power management schemes are generally accomplished by monitoring and controlling power to bus slaves. A bus slave is any type of device that receives, but is incapable of initiating bus cycles, contrary to a bus master which can gain control of the system bus and also initiate bus cycles. Power management is mostly directed toward I/O bus slave devices since such devices generally require a large amount of power to operate in IBM PC/AT compatible computers.

For example, it is commonly known that power must be supplied to an electric motor of a floppy disk drive for the disk drive to operate. However, when the floppy disk drive is not being utilized, the computer system is wasting its limited power supply by unnecessarily powering the disk drive motor. To minimize such waste, a conventional computer system could be designed to discontinue supplying power to the floppy disk drive motor. Unfortunately, such a design would cause its software application to unnecessarily fail if the application sought access to the floppy disk drive which was "powered-off".

In response to the obvious need for effective power management, Intel developed an Intel Architecture Microprocessor 1 comprising a central processing unit ("CPU") 2, a bus controller 3 and a power management macro ("PMM") 4, coupled together by an internal system bus 5 as shown in FIG. 1. The PMM 4 is a special hardware block which provides I/O traps for trapping any access requests by the CPU 2 to any I/O device 9a–9n which has been powered-off and generates a System Management Interrupt ("SMI") signal by activating a SMI control signal line 8 being coupled between the PMM 4 into the CPU 2.

The PMM 4 is capable of generating two kinds of SMIs; namely, a synchronous SMI And an asynchronous SMI. The synchronous SMI occurs due to an internal interrupt, such as a trap, while the asynchronous SMI occurs at any time due to a specific event that requires service before proceeding.

In general, the PMM 4 is used to monitor the computer system for events requiring a change in power status (i.e., whether an I/O device needs to be "powered-off" or "powered-on"). If such an event is detected, the PMM 4 activates the SMI control signal line 8 which acts as a request signal for the CPU 2 to enter into a System Management Mode ("SMM"). SMM is a special mode allowing the CPU 2 to operate in a special environment completely isolated from other software applications. Once the SMM commenced, an internal software service routine, hereinafter referred to as a "SMI handler routine", services the SMI by either powering on or powering off the I/O device. The information necessary to determine whether to "power-on" or "power-off" the I/O device is contained in a SMM status register (not shown) within the PMM 4. After the SMI handler routine has finished servicing the SMI, the SMM would be exited to allow the software application to continue.

The Intel Architecture Microprocessor 1 is coupled to a plurality of bus slaves, preferably I/O devices 9a–9n. All of these devices are coupled together through a peripheral component interconnect bus (the "PCI bus") 6. The CPU 2 incorporated within the Intel Architecture Microprocessor 1 includes a system management first-in last out register (a "SMFILO register") 7 operating in accordance with a first-in, last-out storage scheme. The SMFILO register 7 keeps track of all the I/O cycles generated by the CPU 2. The SMI handler routine reads the SMFILO register 7 and based on the contents thereof, determines which I/O device 9a–9n cannot be accessed, what data was being written, etc. Based on this information, it can decide whether to re-start the I/O bus cycle when the particular I/O device is accessible.

However, one problem associated with the conventional PMM 4 is that it does not manage power consumption for I/O devices being controlled by an alternate bus master 10, but rather, for only I/O devices controlled by the CPU 2. As shown in FIG. 1, the SMFILO register 7 is incorporated within the CPU 2 within the Intel Architecture Microprocessor 1, and thus, the SMFILO register 7 does not store any information pertaining to I/O bus cycles generated by the alternate bus master 10 in the computer system. As a result, if an I/O trap occurs for the alternate bus master 10, the SMI handler routine does not have enough information about to the I/O bus cycle to reliably determine whether to re-start it. Such unreliability has caused many software applications to unnecessarily fail. Moreover, I/O port emulation using traps is not possible for alternate master accesses.

SUMMARY OF THE INVENTION

In light of the foregoing, it can be appreciated that there exists a bona fide need for a power management system capable of storing the contents of a bus cycle generated by any bus master; namely, its data and address.

It is also an object of the present invention to provide a Power management scheme which is inexpensive to implement.

It is another object of the present invention to provide a Power management scheme which would manage power for each I/O device on the system bus, regardless of which bus master controls the system bus.

Yet it is another object of the present invention to prevent unnecessary failure of a computer system's software application.

These and other objects of the present invention are provided by a shadow port and a corresponding register used for transferring data, address and status information concerning a preceding I/O bus cycle before a system management interrupt is initiated. The shadow port is an address location of a register having a predetermined number of bits, wherein the register is capable of accessing address, data and status information stored in a plurality of system management shadow registers through successive bus cycles.

The present invention further includes a method for transferring data, address and status information concerning a preceding I/O bus cycle. Such method primarily comprises four steps. A first step is to unlock memory space allocated to registers within the PMM (i.e. the PMM register space) since the PMM register space is normally locked for system security. A second step is to read status information from at least one status register within the plurality of system management shadow registers in order to ascertain the cause of the system management interrupt. Thereafter, the address information within the system management shadow registers is read to find out details pertaining to the trapped I/O cycle, such as, for example the CPU accessing a powered-off disk drive, requiring the PMM to intervene. The final step is to retrieve data from the system management shadow registers one byte at a time. The reading of the status information, address and data is accomplished by the corresponding register repeatedly accessing the system management shadow registers through the shadow port.

BRIEF DESCRIPTION OF THE DRAWINGS

The objects, features and advantages of the present invention will become apparent from the following detailed description of he present invention in which.

DETAILED DESCRIPTION OF THE INVENTION

The present invention relates to an apparatus and method for managing power in a computer system. More particularly, the present invention relates to a port and corresponding register used to transfer data, address and status information concerning a most recent I/O bus cycle before initiating and servicing a system management interrupt ("SMI"). In the following detailed description, numerous specific details are set forth, such as a bit width of the power management shadow port register. It is apparent, however, to one skilled in the art that the present invention may be practiced without incorporating such details. In other instances, well known elements, devices, process steps and the like are not set forth in detail in order to avoid unnecessarily obscuring the present invention. Moreover, while the present description discusses monitoring I/O bus cycles, it is also contemplated that the present invention may be designed to monitor memory bus cycles pertaining to memory devices such as DRAM, SRAM, etc.

Figure 2:
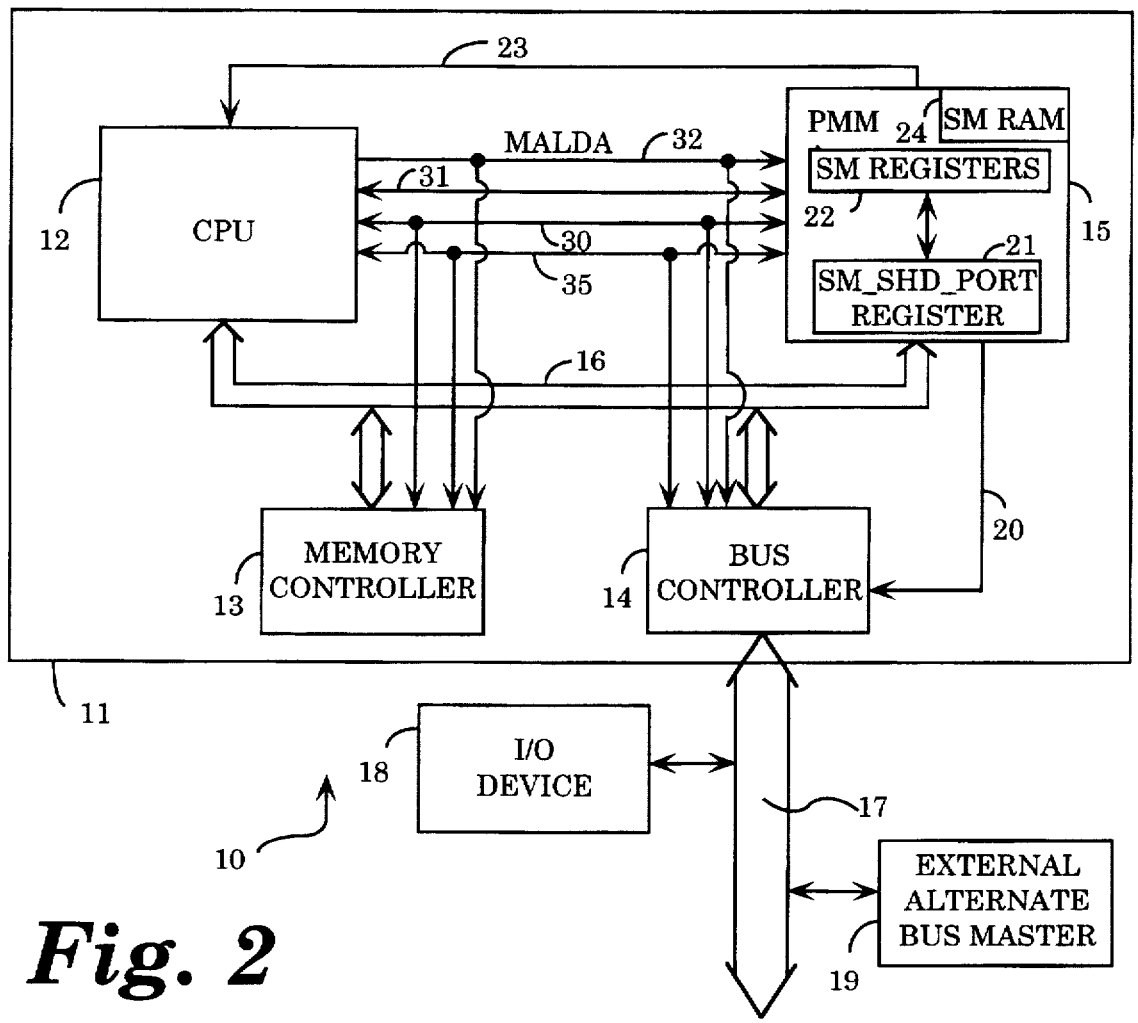
FIG. 2 is a block diagram of the present invention featuring data and control lines.

Referring to FIG. 2, it illustrates a computer system and a few of its associated data and control signal lines incorporating a single chip integration 11 usable in all ranges of portable and laptop computers as well as low end desktop computers. The chip integration comprises a CPU 12, a memory controller 13, peripheral component interconnect ("PCI") bus controller 14 and the Power Management Macro ("PMM") 15. Each of the above are coupled to an internal multi-master system bus 16.

The PCI bus controller 14 is further coupled to the PCI bus 17 to enable communications between at least one I/O device 18 and one bus master, such as the CPU 12, internal alternate bus master (e.g., memory controller 13) or an external alternate bus master (e.g., an external DMA Controller) 19, hereinafter generically referred to as a "bus agent". Although the present disclosure discusses the implementation of the single chip integration 11, it is contemplated that the present invention may be practiced as a combination of discrete components coupled together by a bus in order to share information.

Figure 1:
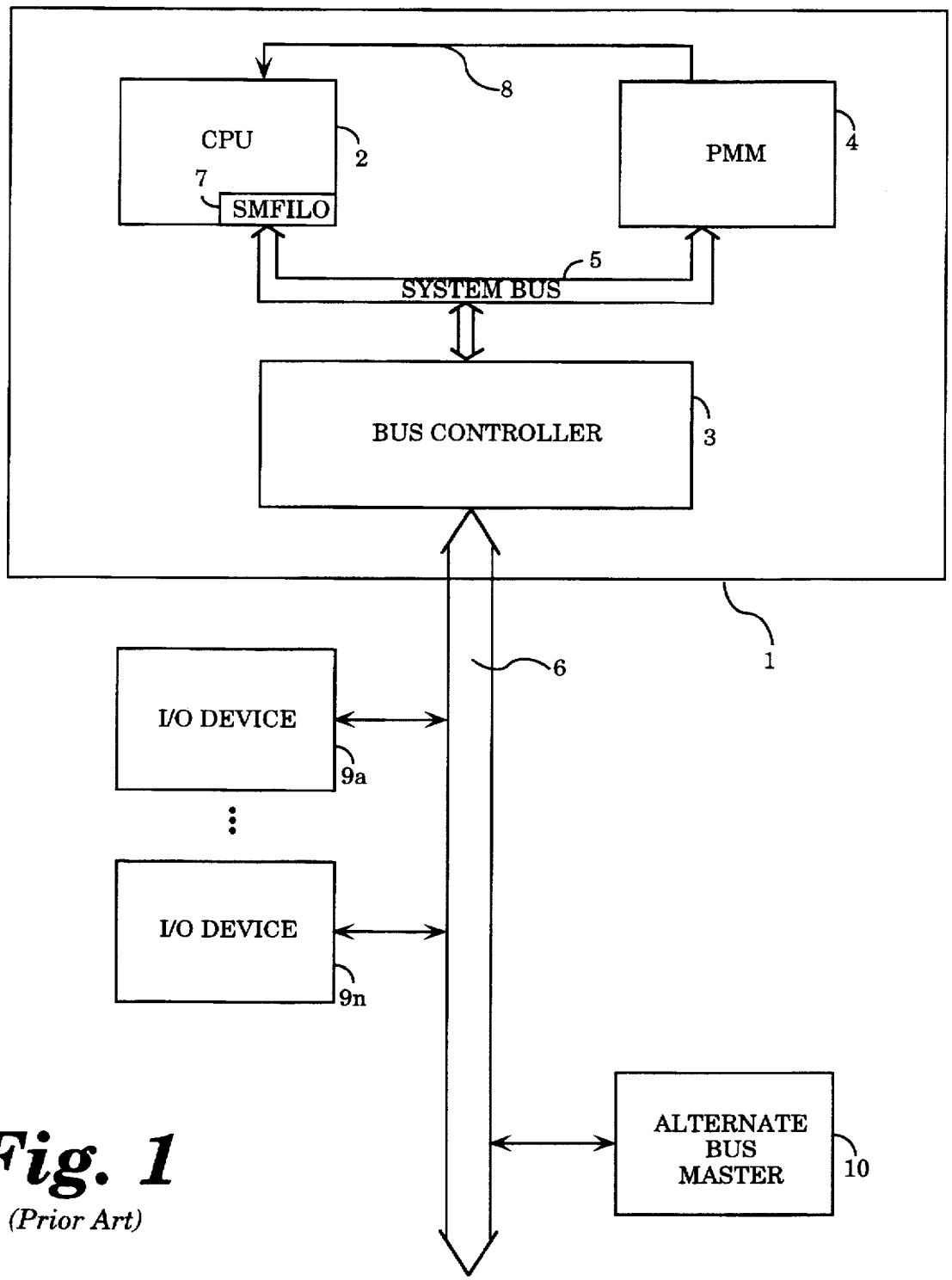
FIG. 1 is a block diagram of a conventional prior art Intel Architecture Microprocessor comprising a CPU, a memory controller and a bus controller, wherein the CPU contains a SMFILO register.

Accordingly, since both the CPU 12 and the internal and external alternate bus masters are able to control the internal system bus 16, the conventional architectural scheme for monitoring bus cycles generated by the CPU 12, as shown in FIG. 1, would not be able to monitor a bus cycle from the alternative bus master 19. However, the present invention could monitor these bus cycles.

The present invention relates to a system management shadow port (not shown) residing in an address location in the PMM's index address space. The shadow port enables a corresponding register, namely, a system management shadow port register (the "SM_SHD_PORT register") 21, to read or store data, address and status information from a plurality of system management shadow registers (hereinafter referred to as the "SM shadow registers") 22 through successive read and write cycles, respectively. As a result, the SM shadow registers 22 can be accessed through a common port (i.e., the shadow port) rather than having to be individually accessed through multiple ports.

The SM shadow registers 22 are a bank of transparent latches with enables which are placed within the PMM 15. The inputs of these latches are coupled to the internal system bus 16, byte enable pins, etc. The latches are enabled to capture data address and status information at the end of every I/O cycle via internal logic. This is how "shadows" (i.e., copies of information) of subsequent I/O cycles are maintained.

When the SMI is generated, the internal control logic does not enable the latches anymore. Thus, a shadow of the I/O cycle before the SMI is maintained for the SMI handler routine to utilize. The latches can be re-enabled to capture I/O cycles after the SMI handler routine has finished reading the SM shadow registers 22.

In the present embodiment, a PCI bus controller 14 forwards any transactions found on the PCI bus 17 onto the internal bus 16. Hence the SM shadow registers 22 can latch data pertaining to any cycle from either the PCI bus 17 or the internal bus 16. Hence, the PMM 15 would be able to monitor the bus cycles generated by every bus master.

Figure 3:
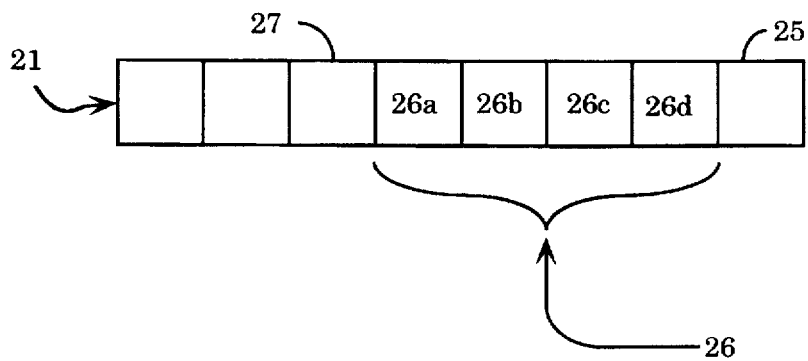
FIG. 3 is detailed view of System Management Shadow Port register.

Referring now to FIG. 3, the SM_SHD_PORT register 21 is illustrated having a bit width of eight bits in order to enable data, physical addresses and status information to be stored therein. As previously stated above, the SM_SHD_PORT register 21 may be designed to be any bit width or even a plurality of registers so as to be able to store information concerning not only the most recent bus cycle, but also a number of prior bus cycles.

As in conventional system management schemes, SM shadow registers 22, such as the SMFILO register 7 shown in FIG. 1, continue capturing information pertaining to most recent I/O bus cycle until the SMI is generated by the PMM 15. The SMI is generated by activating a $\overline{\text{PSMI}}$ signal line 23 coupled between the PMM 15 and the CPU 12 so as to disable (i.e., freeze) the SM shadow registers 22 while the SMI handler routine is servicing the SMI. The SMI handler routine can then store such information in a System Management Random Access Memory ("SMRAM") 24, and allow the software application to continue.

For each I/O bus cycle captured, the SM shadow registers 22 store seven bytes of information, including (i) up to four bytes each having eight bits of data (D0–D31), (ii) two eight-bit bytes of I/O address (A0–A15) and (iii) a status byte which includes a valid bit, a plurality of byte enable bits and a write/read bit. These shadow registers are serially accessed through the SM_SHD_PORT register 21 one byte at a time during successive read cycles.

As illustrated in FIG. 3, the status byte stored in the SM shadow registers 22 is first read into the SM_SHD_PORT register 21. The status byte is read first because it contains information about which data bytes are valid and if the particular I/O cycle field is valid. The bits are described as follows:

Bit 0 is a VALID bit 25 which indicates if this bus cycle field contains valid data. The VALID bit 25 is set to indicate that the SM shadow registers 22 contain valid data, but is only set for I/O trap SMIs caused by CPU accesses. The VALID bit 25 remains inactive when the data stored in the SM shadow registers 22 is from a non-CPU master bus cycle.

Bits 1–4 are four byte enable bits 26a–26d referred to as $\overline{\text{BE0}}$ through $\overline{\text{BE3}}$ respectively. The byte enable bits 26a–26d are designed to be active-low and are primarily used to indicate whether data read from the SM shadow registers 22 during each of a second, third, fourth and fifth read cycle contained valid data. If any of these bits are set to be logic "high", then its corresponding data byte contains invalid data.

The sixth bit referred to as "Bit 5" is a read/write bit 27 which indicates whether the stored I/O bus cycle generated by the bus master was a write or a read instruction. In the present example, the read/write bit 27 is set when the I/O bus cycle was operating as a write instruction but could easily be altered. Such "read" or "write" information is important because if the bus cycle was a read bus cycle to a device which is powered-off, the data is most likely invalid. Write instructions, however, usually transfer valid data.

Bits 6–7 are reserved to be used in another unrelated application.

When the I/O trap range is programmed, all accesses to that range are trapped, regardless of bus ownership. The I/O trap range is a range of I/O addresses to which a particular device responds. The PMM 15 is able to determine whether the CPU 12 controls the internal system bus 16 at the time of the trap by sampling the Memory Controller's Hold Acknowledge MHLDA 32 output. The MHLDA signal 32 acknowledges that the CPU 12 has given up control of the internal system bus 16. In the present architecture, if the CPU 12 is not in control of the internal system bus 16, any cycles currently on the internal system bus 16 may be generated by any number of other bus agents, including the external alternate bus master 19.

If a bus cycle being trapped on the external system bus 17 is generated by the external alternate master 19, then the PCI bus controller 14 is notified by an active low PMM select signal, referred to as the $\overline{\text{PMMSEL}}$ signal 20 and places the bus cycle onto the internal system bus 16 so that the PMM 15 can shadow it. Thus, the PMM 15 can shadow any I/O bus cycles within the computer system 10 in its SM shadow registers 22. Since it also knows whether the internal system bus 16 is controlled by the CPU 12 or any alternate bus master at the time of the trap, it can accordingly set the "Valid" bit. Now, the SMI handler routine can figure out where the trapped cycle originated, and decide whether or not to re-start the cycle. Only the CPU 12 has automatic I/O re-start capability.

Figure 4:
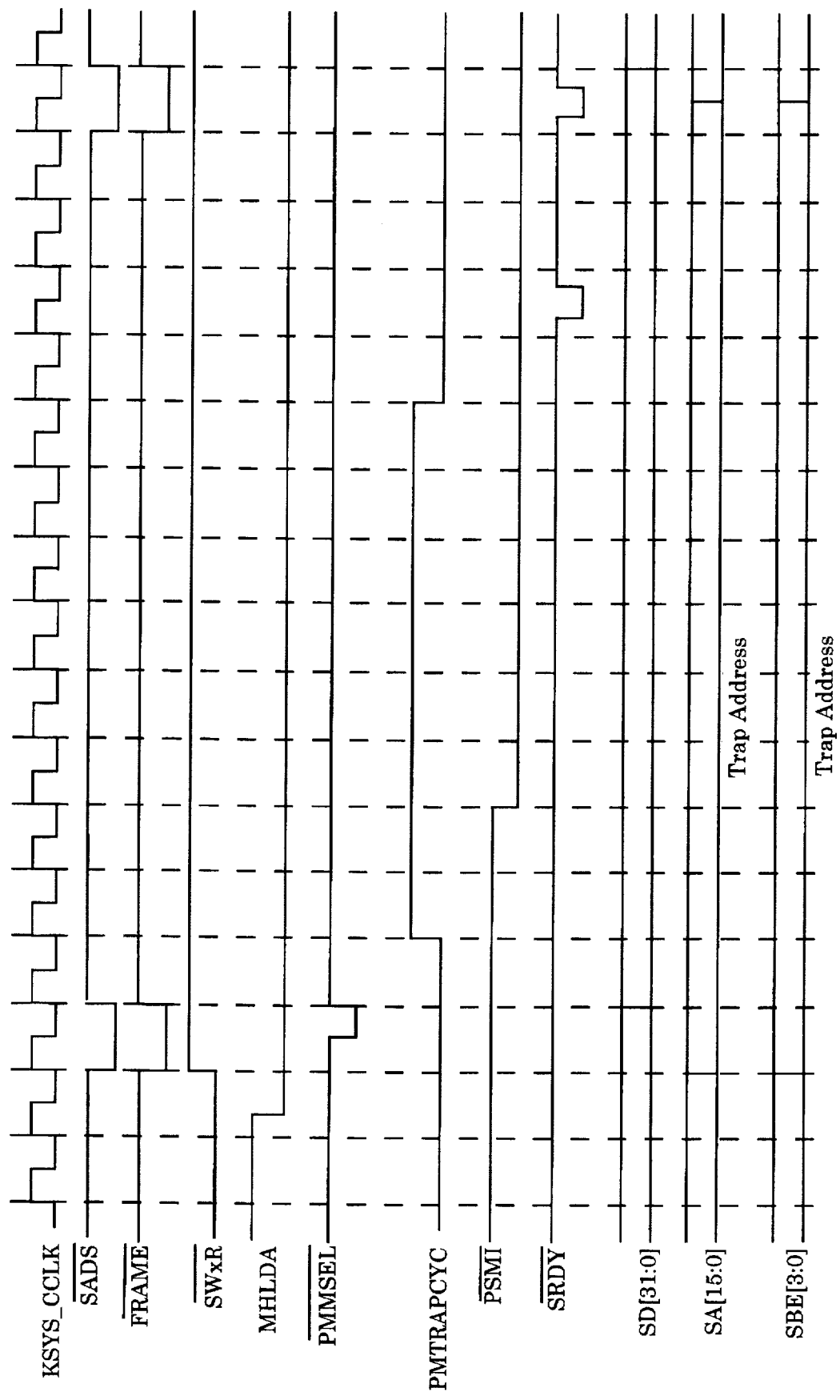
FIG. 4 is a timing diagram of the operations of a computer system incorporating the system management shadow port and the system management shadow port register.
Figure 5:
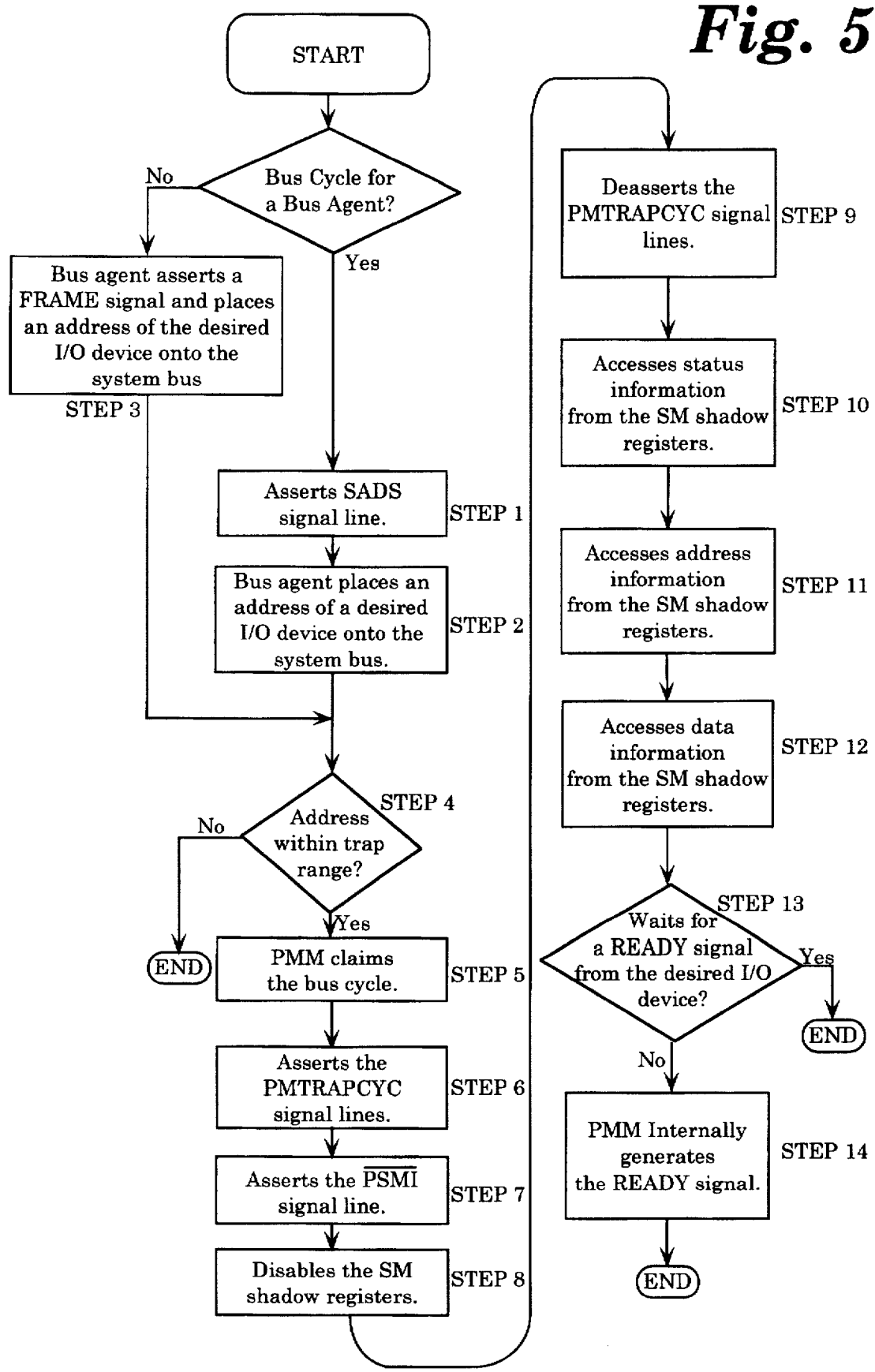
FIG. 5 is a flowchart on the operations of the System Management Shadow Port.

The following is a detailed description of the operations of the power management architecture scheme trapping the internal system bus cycle pursuant to a particular design of the embodiment in FIG. 2 after the PMM register space is unlocked. As illustrated in FIG. 2 in combination with the timing diagram in FIG. 4, to commence the each bus cycle, either the CPU 12 or the internal alternate bus master 13 asserts an address strobe $\overline{\text{SADS}}$ 30 to initiate a cycle (Step 1). Concurrently, an address of the I/O device that the bus agent is attempting to access is placed on the internal system bus 16 (Step 2). The address strobe signal $\overline{\text{SADS}}$ 30 simply affirms that the address is valid. If the external alternate bus master 19 desires to initiate the bus cycle, it does not assert the address strobe $\overline{\text{SADS}}$ 30; rather, it places an active $\overline{\text{FRAME}}$ 31 signal in combination with the address of the I/O device onto the PCI bus 17 which, in turn, is placed on the internal system bus 16 (Step 3).

After the I/O trap mechanisms determine that the address falls within one of the trap ranges (step 4), the PMM 15 claims the bus cycle (Step 5). Thereafter, the PMM 15 asserts a PMTRAPCYC signal 35, which when active, disables the bus agent from prematurely terminating the bus cycle (Step 6). This guarantees that the bus agent will not start a new cycle while the bus cycle is disabled. Thereafter, the PMM 15 generates a SMI request signal which is inputted into the CPU 12 through the $\overline{\text{PSMI}}$ signal 23 in order to invoke the SMI handler routine (Step 7). At this time, the PMM 15 disables the SM shadow registers 22 for use by the SMI handler routine (Step 8).

After allowing enough time for the CPU 12 to recognize the SMI, PMTRAPCYC signal 35 is deasserted and the bus cycle is terminated (Step 9). This guarantees that the bus agent does not start a new cycle before the SMI handler routine commences; otherwise, if a new cycle is mistakenly executed, then the shadowed data becomes invalid.

The SMI handler routine accesses information from the plurality of SM shadow registers 22 through the system management shadow port in combination with the SM_SHD_PORT register 21 by first reading status information from at least one status register within the plurality of SM shadow registers 22 in order to ascertain the cause of the system management interrupt (Step 10). Thereafter, address information within the SM shadow registers 22 is read to determine details pertaining to the trapped I/O cycle, such as, which device is powered-off (Step 11). Then, data bytes are retrieved from the SM shadow registers 22 sequentially (Step 12). The reading of the status information, address and data is accomplished by the SM_SHD_PORT register 21 repeatedly accessing the SM shadow registers through the system management shadow port.

Once the SMI has been serviced by the SMI handler routine in order to "power-on" the selected I/O device, the selected I/O device will generate a $\overline{\text{SRDY}}$ signal (Step 13). However, if the $\overline{\text{SRDY}}$ signal has not been returned within a predetermined time period, the PMM 15 will generate the $\overline{\text{SRDY}}$ signal, assuming that the selected device is permanently powered-off or the like (Step 14).

The present invention described herein may be designed in many different methods and using many different components. While the present invention has been described in terms of various embodiments, other embodiments may come to mind to those skilled in the art without departing from the spirit and scope of the present invention. The invention should, therefore, be measured in terms of the claims which follow.

What is claimed is:

1. A power management device operating in combination with a power management software routine to monitor access request signals for a bus slave which are placed on a system bus by an alternate bus master during a current bus cycle the power management device comprising:

first means for capturing data, address and status information of the current bus cycle, said first means is temporarily disabled from capturing information pertaining to a bus cycle immediately following the current bus cycle upon determining that said address of the current bus cycle is directed to the bus slave when it is non-accessible; and second means for subsequently accessing said data, address and status information stored within said first means through a single port, said second means includes a system management shadow port register that is accessible to said power management software routine.

2. The power management device according to claim 1, wherein said first means includes a plurality of registers coupled to the system bus said plurality of registers are enabled by the power management software routine once the bus slave is accessible.

3. The power management device according to claim 2, wherein said system management shadow port register stores at least eight bits of information for every read cycle initiated by the system management interrupt management software routine.

4. The power management device according to claim 3, wherein upon receiving status information from the plurality of registers, said system management shadow port register dedicates a bit to indicate whether each of said plurality of registers contains valid data.

5. The power management device according to claim 4, wherein said system management shadow port register further includes a plurality of bits dedicated to indicate which bytes of data are valid.

6. The power management device according to claim 1, wherein the single port resides in an address location within an index address space of the power management device.

7. A device, operating in conjunction with a power management software routine, adapted to monitor access request signals for a bus slave placed on a system bus by an alternate bus master, the device comprising:

a first plurality of registers that capture data, address and status information of a current bus cycle initiated by the alternate bus master, said first plurality of registers are disabled from capturing information pertaining to a bus cycle following the current bus cycle after determining that the bus slave is not accessible and are subsequently enabled to capture said information for the bus cycle once the bus slave is accessible; and a system management shadow port register coupled to said first plurality of registers and accessible to the power management software routine, said system management shadow port register is configured to obtain said data, address and status information from the first plurality of registers upon request by the power management software routine for use in making the bus slave accessible.

8. A computer system capable of operating in a power management scheme, said computer system comprising:

processor means for initiating bus cycles;

receiver means for receiving said bus cycles;

alternate means for initiating bus cycles;

bus means for coupling said processor means, said alternate means and said receiver means;

interrupt means for monitoring at least one access request signal placed on said bus means by said alternate means and for generating an interrupt signal to be inputted into said processor means in order to discontinue operations of the computer system when said receiver means requires a change of power status, said interrupt means includes first means for capturing data, address and status information of a current bus cycle, said first means is temporarily disabled from capturing information pertaining to a bus cycle immediately following the current bus cycle upon determining that said address of the current bus cycle is directed to the bus slave when it is non-accessible, and second means for subsequently accessing in serial the data, address and status information contained within the first means, said second means includes a system management shadow port register that is accessible by a software means; and said software means executed by the processor means, for enabling the second means to obtain the data, address and status information from said first means and re-enabling said first means to capture data, address and status information of a bus cycle following the current bus cycle after the bus slave is accessible.

9. The computer system according to claim 8, wherein the first means includes a plurality of registers coupled to the bus means.

10. The computer system according to claim 9, wherein the system management shadow port register stores at least eight bits of information for every read cycle.

11. The computer system according to claim 10, wherein upon receiving status information from the plurality of registers, the system management shadow port register dedicates at least one bit to indicate whether the current bus cycle contains valid data.

12. The computer system according to claim 11, wherein said system management shadow port register further dedicates a plurality of bits to indicate whether successive bus cycles contain valid bytes of data.

13. The computer system according to claim 8, wherein the interrupt means is coupled to the processor means through an interrupt signal line in order to enable transmission of the interrupt signal from the interrupt means to the processor means.

14. The computer system according to claim 10, wherein the system management shadow port register resides in said interrupt means.

15. A computer system capable of operating in a power management scheme, said computer system comprising:

a system bus;

a central processing unit coupled to said system bus, said central processing unit obtains control of the system bus by at least requesting an I/O bus cycle;

a bus slave electrically coupled to said system bus, said bus slave is configured to receive I/O bus cycles;

an alternate unit electrically coupled to said bus, said alternative unit obtains control of the system bus by requesting an I/O bus cycle;

a power management unit coupled to the system bus, the power management unit monitors at least one access request signal for said bus slave placed on the system bus by said alternate unit, the power management unit includes
- a first plurality of registers coupled to the system bus, the first plurality of registers capture data, address and status information of a current bus cycle initiated by said alternate unit and become disabled by a system management software routine after capturing the data, address and status information if said bus slave is inaccessible,
- a system management shadow port register coupled to the first plurality of registers, the system management shadow port obtains the data, address and status information from the first plurality of registers for use by the system management routine to make said bus slave accessible, and
- a port through which said system management shadow port register reads said data, address and status information from said first plurality of registers; and said system management software routine being executed by the central processing unit in order to enable the system management shadow port register to read the first plurality of registers through the port.

16. A method for managing power within a computer system being controlled by one of a processor or an alternate bus master, said method comprising the steps of:

capturing data, address and status information associated with a current bus cycle by a plurality of registers;

issuing a system management interrupt upon detecting an input/output access request for a selected I/O device that is currently inaccessible by the alternate bus master during a current bus cycle; and servicing the system management interrupt, said servicing step includes the steps of
- reading status information from a system management shadow port register obtained from said plurality of registers via a port in order to ascertain a reason for the system management interrupt,
- reading address information from said system management shadow port register obtained from the plurality of registers in order to determine which of at least one I/O device caused the system management interrupt to be issued, and
- retrieving data sequentially from said system management shadow port register obtained from the plurality of registers by repeatedly accessing said system management shadow port register.

17. The method according to claim 16, wherein said issuing step includes the steps of:

placing an address of a selected I/O device that the alternate bus master is attempting to access onto an internal system bus;

determining whether the address of the selected I/O device falls within a predetermined address trap range;

disabling the alternate bus master from prematurely terminating the I/O bus cycle by asserting a trap signal;

generating the system management interrupt;

transmitting the system management interrupt into a central processing unit through a system management interrupt signal line in order to invoke a system management interrupt service routine; and disabling the plurality of registers containing data, address and status information of a current bus cycle from being written into during the system management interrupt service routine.

18. The method according to claim 17 including steps after the step of servicing the system management interrupt, wherein the method further comprises the steps of:

receiving an active ready signal from the selected I/O device indicating that the selected I/O device is powered-on; and generating the active ready signal if the active ready signal has not been returned by the selected I/O device within a predetermined time period.

* * * * *

UNITED STATES PATENT AND TRADEMARK OFFICE
CERTIFICATE OF CORRECTION

| | | |
|---|---|---|
| PATENT NO. | : | 5,630,147 |
| DATED | : | May 13, 1997 |
| INVENTOR(S) | : | Datta et al. |

It is certified that error appears in the above-identified patent and that said Letters Patent is hereby corrected as shown below:

In column 1 at line 11 delete "lease" and insert --least--

In column 3 at line 30 delete "he" and insert --the--

Signed and Sealed this

Ninth Day of September, 1997

Attest:

BRUCE LEHMAN

Attesting Officer

Commissioner of Patents and Trademarks